United States Patent [19]

Acker

[11] 4,390,191

[45] Jun. 28, 1983

[54] BICYCLE CONSTRUCTION

[76] Inventor: Otto H. Acker, P.O. Box 2, Washougal, Wash. 98671

[21] Appl. No.: 201,165

[22] Filed: Oct. 27, 1980

[51] Int. Cl.³ .............................................. B62K 19/00
[52] U.S. Cl. .............................. 280/281 R; 224/32 R; 301/9 SB
[58] Field of Search ................... 280/281 R, 284, 278, 280/279, 287, 288, 289 R, 289 A; 224/32 R, 32 A, 39; 301/9 SB, 105 B

[56] References Cited

U.S. PATENT DOCUMENTS 2,051,953  8/1936  Leathers ........................... 301/9 SB

FOREIGN PATENT DOCUMENTS

| 586407 | of 1925 | France ............................... 301/9 SB |
| 1149612 | 12/1957 | France ................................. 280/287 |
| 472724 | 6/1952 | Italy ................................. 280/289 A |
| 493372 | 4/1954 | Italy ................................. 280/281 R |
| 541582 | 4/1956 | Italy ................................. 280/289 A |
| 96587 | 12/1921 | Switzerland ..................... 280/281 R |
| 202170 | 8/1923 | United Kingdom ............ 280/281 R |

Primary Examiner—Joseph F. Peters, Jr.
Assistant Examiner—Ross Weaver
Attorney, Agent, or Firm—Eugene M. Eckelman

[57] ABSTRACT

A single wheel-support arm depends integrally from the front and rear of a bicycle frame. Each arm has an integral spindle extending laterally from one side thereof adjacent the bottom which rotatably supports a bearing housing. The housing has a radial flange and the bicycle wheels have a cup-shaped hub portion arranged to be releasably secured to the flange. Spokes for the wheel are connected between an outer rim and a right angle flange on the hub. The bicycle includes a support for holding a spare wheel in horizontal position over the rear fender of the bicycle, such wheel being stabilized laterally by a cross channel provided on the frame.

2 Claims, 4 Drawing Figures

BICYCLE CONSTRUCTION

BACKGROUND OF THE INVENTION

This invention relates to new and useful improvements in bicycle constructions.

Bicycle constructions popularly in use employ bifurcated or fork portions and front and rear wheels journaled on axles supported across the forked portions. Such forked constructions are notably difficult to work on since the wheels are trapped between the fork elements and the workings thereof are difficult to remove or reach. Structures which eliminate the use of the fork arrangement have not been commercially feasible due to a lack of design which is capable of providing a simplified, strong and mechanically suitable support for the wheels.

SUMMARY OF THE INVENTION

According to the present invention and forming a primary objective thereof, a bicycle construction is provided having an improved wheel structure and support assembly, such arrangement being simplified, light in weight, and easily worked on for assembly, disassembly or repair.

In carrying out the objectives of the invention, the bicycle construction utilizes a single wheel support arm depending integrally from each of the front and rear of the frame, and each such support arm has a lateral spindle extending integrally from one side thereof adjacent the bottom. A bearing housing has rotatable support on the spindle, and such bearing housing includes a radially extending flange on the exterior thereof to which a cup-shaped hub portion of a wheel is releasably secured. Such hub portion has a vertical support wall for securement to the flange and has a peripheral right angle flange to which the spokes of the wheel are connected. A sprocket wheel for a drive connection is arranged to be secured between the flange on the bearing housing and the hub of the wheel.

Another object of the present invention is to provide a bicycle construction employing a novel spare wheel carrier.

The invention will be better understood and additional objects and advantages will become apparent from the following description taken in connection with the accompanying drawings.

DETAILED DESCRIPTION OF A PREFERRED EMBODIMENT

Figure 1:
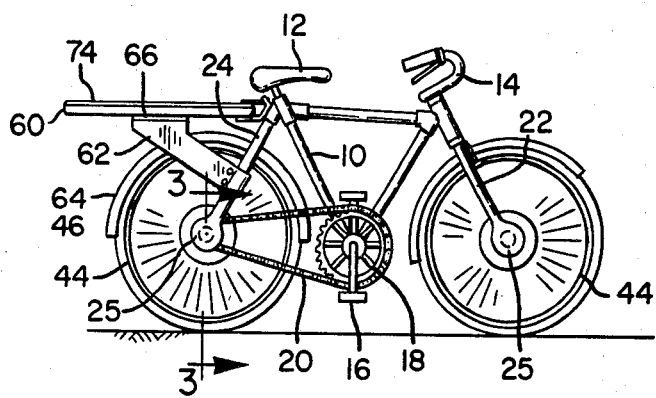
FIG. 1 is a side elevational view of a bicycle embodying features of the present invention.

With particular reference to the drawings, the bicycle of the present invention includes a main frame portion 10 having the usual seat 12 and handle bars 14. A center portion of the frame 10 has downwardly converging frame portions supporting a foot pedal assembly 16 arranged to operate a sprocket wheel 18 engageable by a drive chain 20.

Figure 2:
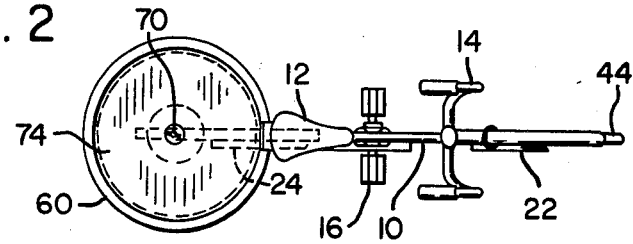
FIG. 2 is a top plan view of the bicycle.
Figure 3:
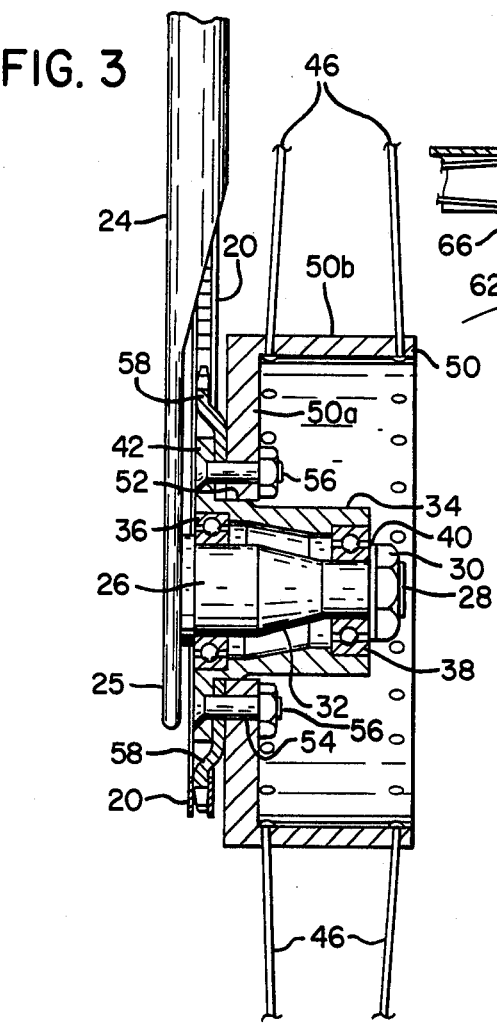
FIG. 3 is an enlarged fragmentary sectional view taken on the line 3—3 of FIG. 1.

Frame 10 has front and rear depending arms 22 and 24, respectively, which as best seen in FIGS. 2 and 3 comprise single support arms offset throughout their length from the main frame. Each of the arms 22 and 24 terminates at the bottom in an enlargement 25 provided with an integral spindle 26, FIG. 3. The plate-like enlargements 25 are offset relative to the axis of their arms 22 and 24, this offset being in a direction opposite from the extension of the spindle 26.

Spindle 26 has a threaded end 28 for receiving a nut 30. The surface 32 of the spindle is stepped and arranged to support a bearing housing 34 by means of inner and outer bearings 36 and 38, respectively. Bearing housing 34 is removably held on the spindle by the nut 30 and end washer 40. Such bearing housing has an integral radially extending flange 42 at its inner end.

Each of the wheels of the bicycle includes a conventional outer tire and rim assembly 44 and spokes 46. According to the invention, the hubs of the wheels comprise a cup-shaped structure 50 having vertical wall portion 50a and an outer right angle flange 50b. Hub 50 comprises an integral part of the wheel, the spokes 46 being connected to the flange 50b in a conventional manner for integral assembly of the hub with the tire and wheel assembly 44.

The wall 50a of the hub has an opening 52, and this opening freely receives bearing housing 34 in the mounted position of the wheel on the bearing housing. The radial flange 42 and the wall 50a of the hub 50 have matching apertures 54 for receiving bolts 56 which provide releasable securement of the hub to the bearing housing. FIG. 3 is a sectional view of the rear wheel assembly, comprising the wheel assembly which is driven by the foot pedal and sprocket wheel 18, and in such assembly a rear sprocket 58 is bolted between the flange 42 and the hub 50, such sprocket wheel also having suitable apertures 54 to receive the bolts 56. In the front wheel assembly, the hub 50 is clamped directly up against the flange 42.

The frame portions 22 and 24 and the associated wheel hub assemblies 50 provide a wheel structure which is extremely simplified in structure and economical to manufacture, which is easy to install and remove, which is easily maintained, and which is rugged in use. The wheel is taken off merely by removing the bolts 56 through the open end of the cup-shaped hub 50, the bearing housing also being readily accessible for removal or maintenance through this open end.

The bicycle of the invention may be provided with conventional brake means and change speed gears, not shown.

Figure 4:
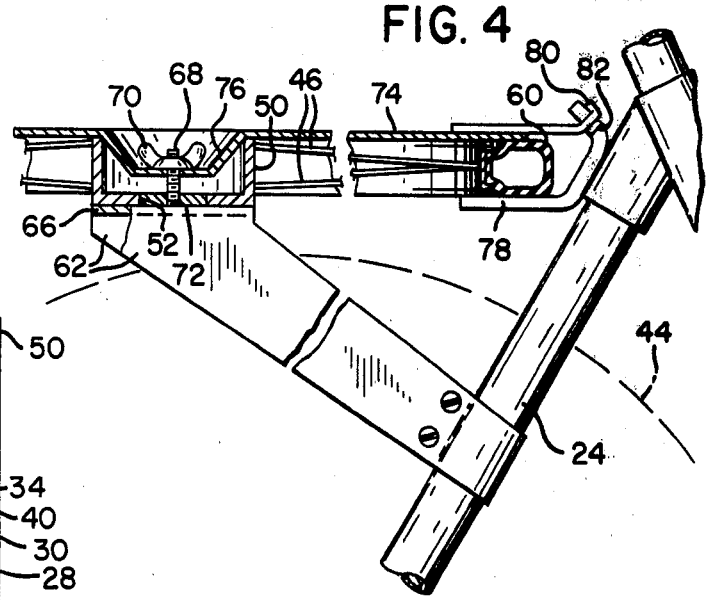
FIG. 4 is an enlarged fragmentary elevational view of a spare wheel carrier also embodying features of the present invention.

Another feature of the present bicycle comprises a novel carrier for a spare wheel 60, FIGS. 1, 2 and 4. Such carrier comprises a pair of rearwardly extending brackets 62 secured integrally to the rear frame arm 24 and projecting up on opposite sides of the rear fender 64. Brackets 62 have a top connecting plate 66 supporting an integral upwardly projecting threaded post 68 for receiving a nut 70. Post 68 has an enlarged base 72 arranged to be received snugly in the opening 52 of the hub 50 when a wheel is laid flat on the plate 66. A cover plate 74 about the size of a wheel has a center well portion 76 through which the post 68 projects, and such cover plate is held releasably in place by the nut 70. A rearwardly facing, laterally extending channel member 78 is secured to the arm 24 of the bicycle frame in a location to receive a portion of the spare wheel 60. This channel maintains the spare wheel against lateral tilting.

Cover plate 74 has a forwardly extending, upwardly turned hook 80 arranged to have releasable hooking engagement in an aperture 82 in the channel member 78. By means of the spare wheel carrier, the bicyclist can carry an extra wheel in a convenient manner, and at the same time the mounting arrangement thereof, namely, the solid support on the brackets 62 and lateral stability provided by the channel 78, allows the spare wheel to serve as a luggage rack or passenger carrier.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A bicycle construction comprising
   (a) a main frame having front and rear ends,
   (b) a single wheel support arm depending integrally from each of said front and rear ends of the frame,
   (c) said support arms being offset throughout their length from said main frame,
   (d) a wheel support assembly at the lower ends of each of said arms,
   (e) each of said wheel support assemblies including an integral spindle extending laterally from one side of said arms adjacent the bottom,
   (f) said support arms having a second offset adjacent the bottom thereof on the side facing the wheel support assemblies,
   (g) a bearing housing having rotatable support on said spindle,
   (h) radially extending flange means on the exterior of said bearing housing,
   (i) a wheel having a hub portion, an outer rim, and radial spokes secured at one of their ends to said rim,
   (j) said hub including a vertical support wall,
   (k) fastening means associated with said support wall releasably securing said hub to said flange,
   (l) a sprocket wheel at said rear end secured between said radially extending flange and said support wall for operating in the area provided by said second offset,
   (m) a peripheral right angle flange on said support wall of said hub secured to the other end of said spokes,
   (n) and foot operated drive means connected between said frame and said sprocket wheel (assemblies) for propelling the bicycle.

2. The bicycle construction of claim 1 including a horizontal plate on said frame over one of said wheels supported by brackets leading upwardly from each side of said frame, said plate being arranged to support a spare wheel in horizontal position, means engageable with said hub releasably fastening a wheel on said plate, and lateral chamber means on said frame arranged to receive a portion of a spare wheel for maintaining such wheel in a stable horizontal position laterally of said frame.

* * * * *